Patented July 11, 1944

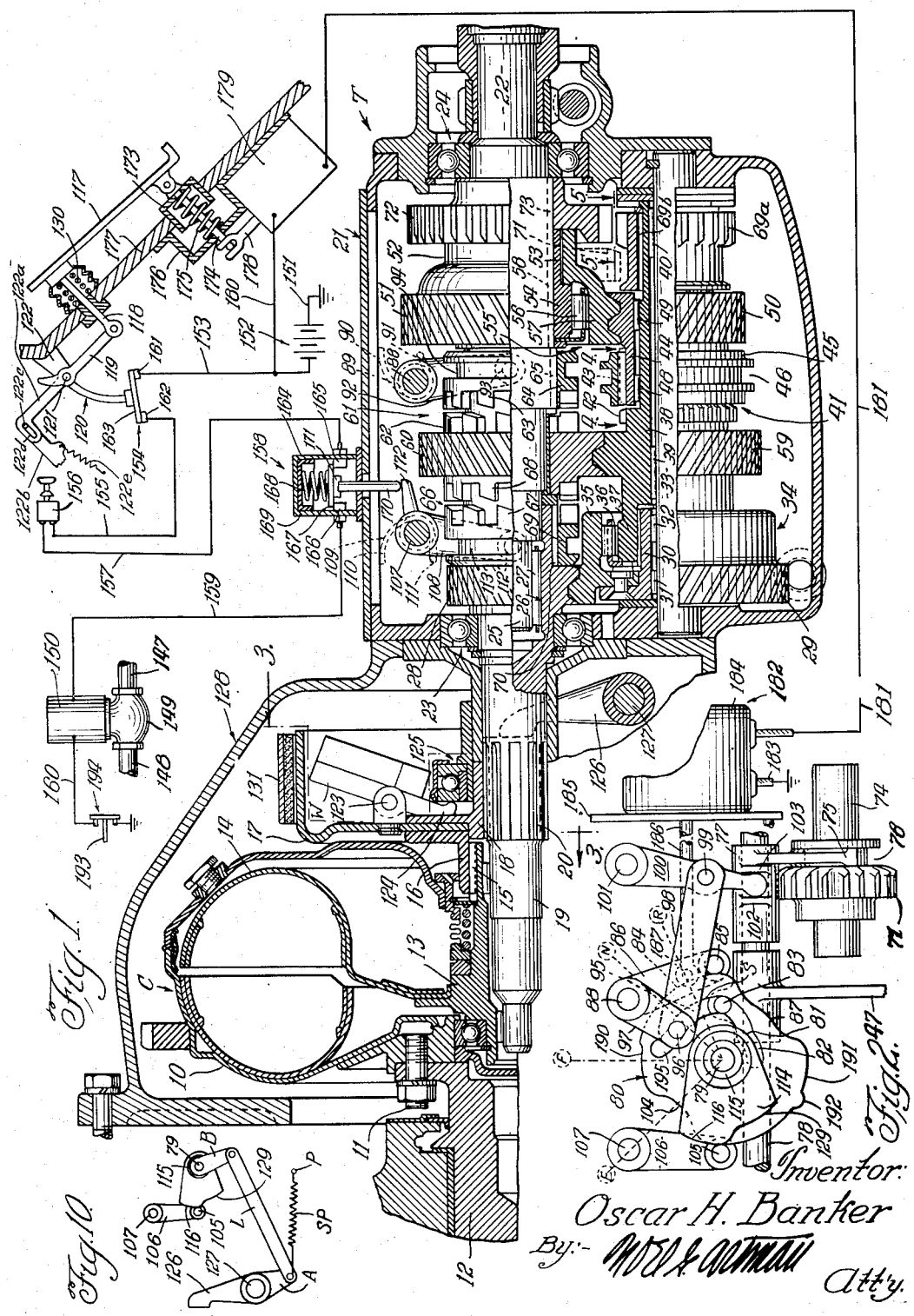

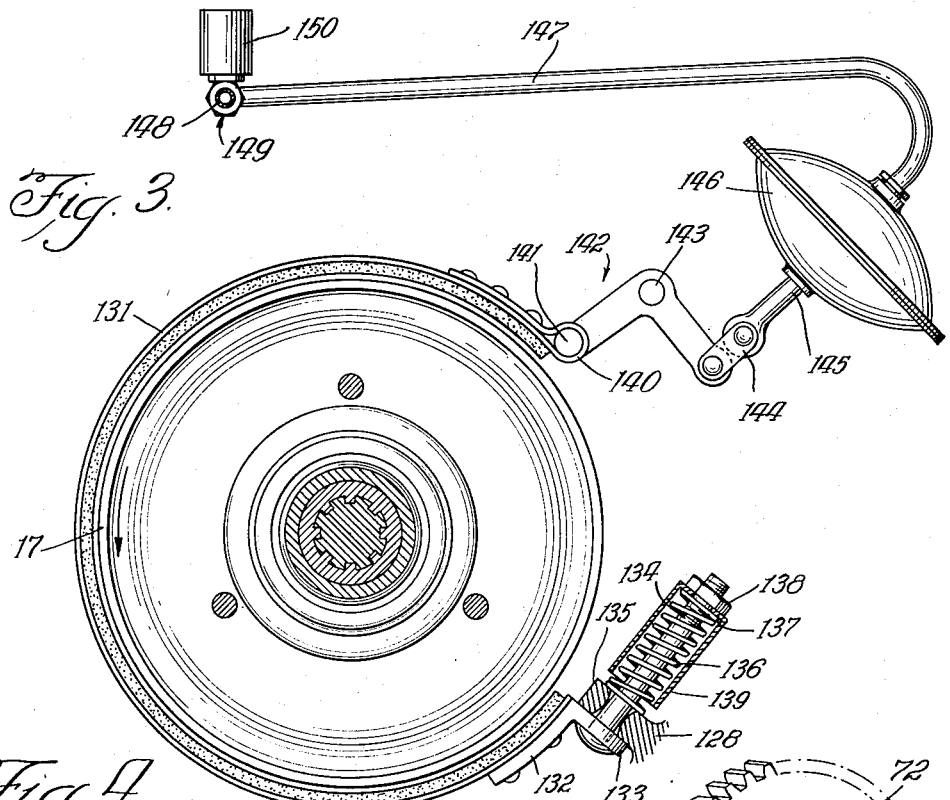

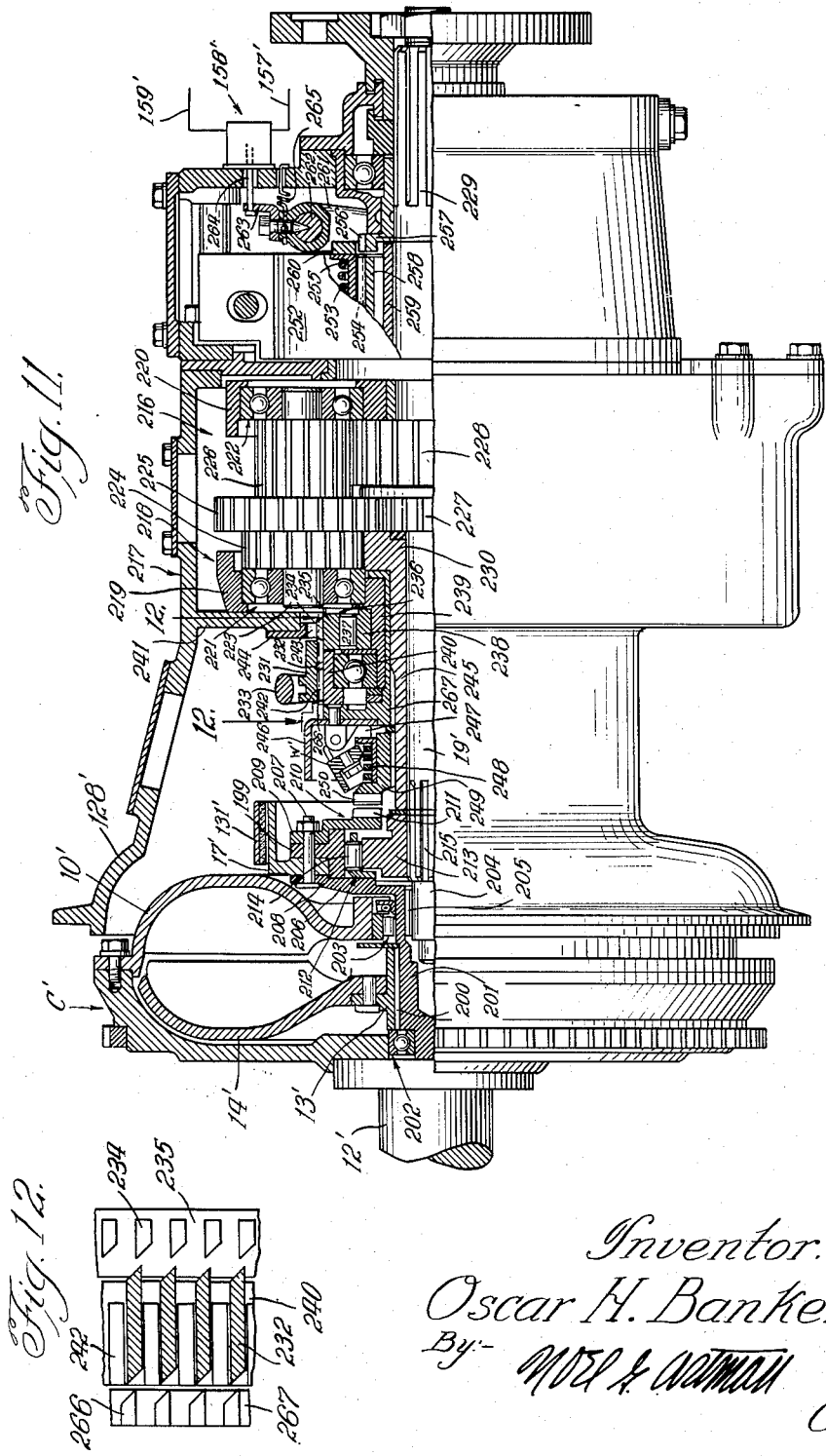

2,353,137

UNITED STATES PATENT OFFICE 2,353,137

CHANGE-SPEED TRANSMISSION

Oscar H. Banker, Evanston, Ill., assignor to New Products Corporation, Chicago, Ill., a corporation of Delaware Application March 17, 1941, Serial No. 383,775

17 Claims. (Cl. 74—472)

This invention has to do with change-speed apparatus for drivingly connecting rotatable drive and driven members for rotation in different speed ratios, and relates particularly to such an apparatus suitable for use between the engine and running gear of a motor vehicle, though not restricted to this use, and to controls for the apparatus.

An object of this invention is the provision of power transmission apparatus in which a coupling such as a fluid flywheel is employed with a plural power train change-speed transmission wherein a lower ratio train includes toothed members meshable to mobilize such train and demeshable to demobilize the same and an overrunning clutch that adapts this train to remain mobilized while a higher ratio train is established in operation, together with means for contravening the loading of the lower ratio train by torque normally impressed thereon from said coupling, when the higher ratio train is not in operation, to relax said lower ratio train and thus facilitate the meshing and demeshing of the toothed members.

Another object is the provision of apparatus as the above, wherein the load contravening means is operable to impart retrograde rotation to the drive part of the overrunning clutch relatively to the driven part thereof as a step in relaxing the power train.

Another object is the provision in a change-speed transmission power train mobilizable by the meshing of meshable toothed members and having therein an overrunning clutch unit, of means associated with the meshable members to cause these members to relatively rotate, pursuant to meshing, and in such direction as is permitted by the overrun of said overrunning clutch; and the invention further contemplates such relative rotating means associated with the toothed members and overrunning clutch of apparatus according to either of the two foregoing objects.

Still another object is the provision in power transmission apparatus in which a starting power train is provided with an overrunning clutch and toothed members meshable to mobilize said train, of throttle responsive means operable to place one of the parts of said clutch in an overrun condition with respect to the other for relaxing the power train to facilitate meshing and demeshing of said toothed members.

Another object is the provision in power transmission apparatus wherein a starting power train, including an overrunning clutch and meshable mobilizing means, is normally impositively loaded when mobilized though not in operation, of throttle controlled means for constraining such loading and for overrunning the drive part of the overrunning clutch with respect to the driven part thereof to relax said power train whereby said mobilizing means may be readily meshed or demeshed. In this respect the invention particularly contemplates a motor vehicle installation operable upon closure of the engine throttle, in stopping the vehicle, to relax the starting power train whereby this train may be easily disconnected and connected again, when desired.

Another object is the provision of power transmission apparatus wherein an overrunning clutch is common to a forward starting train and a reverse starting train in each of which there are meshable means for controlling the mobilization of these trains, and means for rotating the drive part of the overrunning clutch backwardly to relieve the loading of either train and to retain said drive part in the backwardly rotated position against the impositive urge of a coupling device whereby the relaxed condition of these trains is insured during the meshing or demeshing of their respective mobilizing means.

Another object of this invention is the provision of power transmission apparatus in which power is transmitted from a throttle controlled engine through a coupling device such as a fluid coupling to an automatic change-speed transmission wherein a change from a lower ratio power train to alternative power trains of progressively higher ratio is brought about by causing deceleration of an engine-driven one of complemental meshable parts to synchronism with another to result in their meshing so the former can drive the latter and wherein selection of the higher ratio trains is effected by actuation of a selector clutch associated therewith, the apparatus including throttle responsive synchronizer means operable when the engine throttle is closed to brake said engine-driven meshable part and thus shorten its deceleration period, and means operable under control of a throttle control member to cause actuation of said selector clutch.

The invention further contemplates, upon an engine-driven vehicle, apparatus according to the next preceding object, wherein a starting power train includes an overrunning clutch and meshable mobilization control means, and wherein the synchronizer brake is operable upon the closing of the vehicle engine throttle to decelerate the drive part of the overrunning clutch and ultimately rotate the same backwardly with respect to the driven part thereof wherefore each time the vehicle is brought to rest said starting train will be relexaed to facilitate meshing or demeshing of the mobilization control means.

Additional desirable objects, ancilatory to those above recited, and others inherent in and encompassed by this invention will subsequently become apparent.

In the drawings:

Fig. 1 is a fragmentary view partly in section and taken substantially upon a plane extending axially through power transmission apparatus embodying one form of this invention;

Fig. 2 is an elevational view of linkages responsive to both manual and speed responsive controls for adjusting the connections of the transmission power trains;

Fig. 3 is a transverse sectional view looking forwardly substantially upon the line 3—3 of Fig. 1 and illustrating synchronizer brake mechanism to expedite shifting of the transmission power trains and to insure release of overrunning clutch means in certain of the power trains whereby these power trains will be released when the apparatus is not in use.

Fig. 4 is an enlarged fragmentary view, partly in section, of clutch teeth having their ends bevelled for causing relative rotation thereof in a direction determined by the character of such bevelling pursuant to meshing of these teeth, the view being taken on the line 4—4 of Fig. 1;

Fig. 5 is a perspective view, partially diagrammatic, illustrating bevelling at the ends of teeth upon axially meshable reverse train gears employed in transmission of Fig. 1;

Fig. 6 is a panoramic view taken at the section A—B—C—D in Fig. 5 and in the direction of the arrows 6—6;

Figs. 7, 8 and 9 are views corresponding to Fig. 6 but illustrating respectively different arrangements of gear tooth bevels for causing relative rotation of the gears in a direction facilitating meshing of the teeth;

Fig. 10 is an elevational view of a governor controlled linkage for operation of one of the cams in Fig. 2;

Fig. 11 is an elevational view of a modified form of transmission apparatus embodying a form of the present invention, parts being broken away and other parts being shown in section for clarity; and Fig. 12 is a fragmentary view partly in section illustrating bevelled ends upon a jaw clutch of the apparatus shown in Fig. 10, and taken upon the line 12—12 in that figure.

Both forms of transmission apparatus herein disclosed are designed especially for use upon motor vehicles. The first embodiment, now to be described with reference to Figs. 1 to 10, includes a fluid coupling C of which the impeller part 10 is connectible by means such as bolts 11 with an engine crankshaft 12. The hub 13 for the runner or driven element 14 of the coupling C is splined at 15 to a hub portion 16 of a brake drum 17, and a second hub portion 18 of this brake drum is splined to a transmission drive shaft 19 at a splined section 20 thereof, whereby the runner 14 is connected with said transmission drive shaft. While the present embodiment employs a fluid coupling between the engine crankshaft 12 and the transmission drive shaft 19, it should be understood that other forms of clutch or coupling devices, particularly speed responsive friction or electromagnetic clutches, may be used in lieu of the fluid coupling although such fluid coupling is preferred because of its simplicity of construction and its speed responsive characteristics permitting initial slippage resulting in higher engine speeds and corresponding higher torque, facilitating the starting of a vehicle upon which the apparatus may be installed through a higher speed ratio power train than the lowest of available power trains, under normal starting conditions.

The drive shaft 19 is connectible through change-speed gearing generally designated T enclosed within a gear box 21 and for turning a driven shaft 22, the shafts 19 and 22 being journalled in bearings 23 and 24 in the front and back walls of the gear box 21, and the front end of the driven shaft 22 having a bearing section 25 of reduced diameter piloted within a bearing cavity 26 in the back end of the drive shaft and journalled therein upon a set of needle bearings 27 according to standard practice.

Said gearing T has one reverse power train and four forward drive power trains of which the speed ratio is suitable for use in combination with a "geared-up" differential such as that used in association with the rear axle shafts of automotive vehicles. When this transmission is employed in combination with such a "geared-up" differential the first, second and third speeds which are obtained through power trains including speed reduction gearing respectively correspond to the first, second and third speeds (of which the third is obtained by a direct connection of the drive and driven shafts) of a conventional three-speed transmission with a conventionally geared differential, whereas the fourth speed or direct drive connection of this transmission corresponds to a fourth or overdrive connection of such a conventional transmission when operating with an overdrive device of well-known character.

The first speed power train comprises a gear 28 integral with the drive shaft 19 and meshed with a countershaft gear 29 which has a sleeve-like hub 30 journalled by means of needle bearing sets 31 and 32 upon a countershaft bearing-rod 33 suitably anchored in the ends of the gear box. Power is transmitted from the gear 29 through an overrunning clutch 34 including a drive ring 35, clutch rollers 36 and a normally driven actuator member 37 operative to wedge the rollers against the ring when the latter tends to rotate counter-clockwise (as viewed from the front) relative to said actuator member. This actuator member 37 is integral with a long sleeve shaft 38 which is journalled upon the rod 33 by needle bearing sets 39 and 40. The transfer of power continues through a jaw clutch 41 comprising a driving part of clutch teeth 42 arranged circumferentially about the sleeve 38, a driven part comprising circumferentially arranged teeth 43 upon a sleeve 44 and a clutch ring 45 having internal teeth mutually meshable with the teeth 42 and 43 by sliding said ring forwardly to connect the sleeve 44 for rotation with the sleeve 38. A groove 46 in the ring 45 facilitates axial sliding of this ring by means of a shifter fork 47 shown in Fig. 2. When the clutch 41 is disengaged the sleeve 44 is freely rotatable about the sleeve 38 whereon it is carried by needle bearing sets 48 and 49. Said first speed power train is mobilized when the teeth of the clutch 41 are meshed. Thus a gear 50 integral with the sleeve 44 is driven through said clutch and drives a gear 51 which is journalled at its hub 52 upon a hub 53 of an actuator member 54 comprising a part of an overrunning clutch unit 55. This overrunning clutch unit includes clutch rollers 56 and a drive ring 57 integral with said gear 51 as well as said actuator member 54 which is splined at 58 to the driven shaft 22. The actuator member 54 has cam faces (not shown) so disposed that the gear 51 and ring 57 will be effective when rotated clockwise as viewed from the front for causing the rollers to wedge into driving relation between said ring and actuator member so the shaft 22 will be driven from the gear 51.

The second speed power train includes the drive shaft gear 28, the countershaft gear 29, overrunning clutch 34, sleeve 38, a gear 59 integral with said sleeve 38, a gear 60 meshed with said gear 59 and journalled upon the driven shaft 22, and a jaw clutch 61 including a driving component of teeth 62 upon the gear 60 and teeth 63 upon a ring 64 splined at 65 to the driven shaft 22 and slidable axially of said shaft for meshing and demeshing the said teeth. When the clutch 61 is engaged the second speed power train will be established and during operation of this second speed power train the driven shaft will rotate faster than the gear 51 as permitted by the overrunning clutch 55 while the clutch 41 remains engaged for maintaining the first speed power train mobilized.

Third speed is obtained when the clutch 61 is disengaged and a clutch 66 is engaged. Clutch 66 comprises clutch teeth 67 and 68 which are respectively upon the back end of a ring 69, splined at 70 to the back end of the drive shaft 19, and upon the front face or end of the gear 60. Hence when the clutch 66 is engaged and the clutch 61 disengaged power may be transmitted from the drive shaft to the driven shaft through the third speed power train comprising said clutch 66, gears 60 and 59, clutch 41, gears 50 and 51 and the overrunning clutch 55 to the driven shaft. Meanwhile the actuator member 37 of the overrunning clutch 34 will be rotated faster than the clutch ring 35 as permitted by the rollers 36.

Fourth speed is obtained by connecting the drive and driven shafts 19 and 22 for rotation in unison and the power train for accomplishing this is established by concurrent engagement of the clutches 61 and 66, power then being transmitted from the drive shaft through said clutch 66, the hub of gear 60, clutch 61, and its splined member 64 to the driven shaft 22. Concurrently the actuator member 37 of overrunning clutch 34 will be driven at an overspeed with respect to the clutch ring 35 as permitted by the clutch rollers 36 and the actuator member 54 of the overrunning clutch 55 will be driven at an overspeed with respect to the gear 51 as permitted by the rollers 56.

The reverse power train includes the gears 28 and 29, overrunning clutch 34, sleeve 38, gear 69a splined to the sleeve 38 at 69b, an idler gear 71 shown in full lines in Fig. 2 and in broken lines in Fig. 1, and a gear 72 splined at 73 to the driven shaft 22. The idler gear 71 is freely rotatable and axially slidable upon a countershaft 74 which is parallel with the shaft 22 but disposed to the right of the gears 69a and 72, as viewed from the front, wherefore the gear 71 is shown in broken lines in Fig. 1. When the idler gear 71 occupies a forward position, illustrated in Fig. 1, upon its shaft 74 the reverse train is disconnected, but is connectible or establishable when the gear 71 is slid rearwardly mutually into mesh with the gears 69a and 72. Sliding of the gear 71 is accomplished by means of a shifter fork 75 which rides within the groove 76 circumscribing a hub extension of the gear 71 and having a hub portion 77 slidable lengthwise of a shifter fork rod 78.

Normally in the operation of this apparatus the transmission gearing will be connected for starting the vehicle forwardly by means of the second speed train and after the vehicle has attained a selected speed in excess of a predetermined minimum at which speed-responsive means presently to be described is operable to enable establishment of the third or fourth speed power trains, the operator will initiate an automatic change into the fourth speed connection. In conditioning the apparatus for starting in the second speed power train as aforesaid, the operator will shift a lever (not shown) operably connected with a shaft 79 upon which a cam plate 80 is fixed, to cause rotation of this shaft and cam plate counter-clockwise one position from the neutral N to the forward starting position F. Such rotation of the cam plate 80 will carry one end, 81, of a short radius section 82 of a slot S in the cam plate 80 into registry with a stud 83 incident to camming said stud forwardly. Said stud 83 is mounted upon the hub of the shifter fork 47 so that incident to such forward movement of the stud this shifter fork will be slid forwardly upon the rod 78 and thereby engage the clutch 41 for mobilizing the first speed power train. Rotation of the cam plate 80 to position F will also displace a long radius profile section 84 of said cam from engagement with a stud 85 which is mounted in the lower end of an arm 86 and spring-pressed against the edge of said cam plate. A short radius profile section 87 of the cam plate will be carried into registry with said stud 85 so that a shaft 88 upon which the arm 86 is fixed can pivot clockwise under the influence of a spring as that shown in broken lines at 89 in Fig. 1. This spring 89 is wrapped about the shaft 88 and has one end section 90 which reacts against the top of the gear box while an opposite end section 91 acts upon the hub of a shifter fork 92 for rotating such fork and the shaft 88 clockwise, the arrangement being as that illustrated more fully in my co-pending application Serial No. 357,388. The legs of this shifter fork carry pins 93 projecting into diametrically opposite portions of a groove 94 in the clutch ring 64 whereby the clockwise movement of said shifter fork will slide the ring 64 forwardly for engaging the clutch 61. If the teeth 63 happen to be axially aligned with the spaces between the teeth 62 the clutch 61 will engage immediately upon rotation of the cam plate 80 to position F, but, if the teeth 63 and 62 are axially aligned, the opposed ends of these teeth will be pressed into abutting relation by the spring 89 so the clutch will later engage upon the initial rotation of the drive shaft 19 when operatively connected with the engine.

It will be further observed that upon rotation of the cam plate from the neutral N to the forward position F, an arcuate section 95 of the slot S will slide idly past a stud 96 mounted in the lower end of an arm 97 which is pivoted upon the shaft 88. There is a link 98 connecting the stud 96 with a pin 99 in an arm 100 which is pivotally connected with the gear box by means of a pin 101. The lower end of said arm 100 is disposed between bosses 102 and 103 on the hub 77 of the reverse train shifter fork 75, so that if the stud 96 were to be cammed backwardly by the plate 80 the arm 97 would be caused to rotate counter-clockwise for moving the link 98 rearwardly and pivoting the arm 100 counter-clockwise for shifting the fork 75 rearwardly and thus establishing the reverse power train. However, since the stud 96 remains undisturbed at this time the reverse power train will remain disconnected.

Movement of the cam plate from position N to position F carries a short radius profile section 104 into registry with a stud 105 upon an arm 106 fixed upon a cross shaft 107, Figs. 1 and 2, upon which there is carried a shifter fork 108. Said shifter fork 108 is acted upon by a spring 109, shown in broken lines in Fig. 1, coiled about the shaft 107, one end 110 of the spring reacting against the upper wall of the gear box while the opposite end 111 is hooked about and acts upon said shifter fork to urge the same and the shaft 107 to rotate counter-clockwise. The legs of the shifter fork 108 carry pins 112 which project into a groove 113 of the clutch ring 69. Therefore, upon release of the stud 105 in Fig. 2 the spring 109 would be effective for rotating the shaft 107 and the shifter fork 108 counter-clockwise to shift the clutch ring 69 rearwardly for engaging the clutch 66 or placing the ends of the teeth 67 and 68 of this clutch in ratcheting relation should the member 69 be rotating clockwise (as viewed from the front) at a speed in excess of the gear 60 as will be explained presently. However, when the vehicle is at rest as now assumed, a cam plate 114 fixed upon a sleeve 115 journalled upon the manually controlled shaft 79 presents a portion of its long radius profile section 116 in registry with the stud 105 to preclude release of said stud at this time.

With the manually operated cam plate 80 now set as described in the forward position F the studs 105 and 96 will therefore be maintained in the positions shown whereas the stud 83 will have been moved forwardly for engaging the first speed mobilization clutch 41 and the long radius profile section 84 will have been removed from the stud 85 to place the clutch 61 under control of the spring 89. The vehicle is started forwardly by depressing the toe portion of an accelerator 117 for accelerating the vehicle engine in the customary manner. The engine throttle (not shown) is operatively connected with the accelerator pedal 117 by a linkage including a link 118, a leg 119 of a bell crank lever 120, a shaft 121 pivotally mounted in a bracket 122 and fixed to the lever 120 for pivotal movement therewith, a lever 122a fixed to the shaft 121, and a link 122b connected with the lever 122a by a lost-motion arrangement consisting of a pin 122c on the link 122b and an elongated hole 122d in the lever 122a. Means as the contraction spring 122e fixed at its lower end and connected with the link 122b at the opposite end tends to hold this link in the endwise position for closing the throttle. When the toe portion of the pedal 117 is depressed for opening the throttle and causing the engine to accelerate above idling speed the crankshaft 12 and the impeller 10 of the fluid coupling C will be caused to rotate sufficiently fast for the latter to transmit effective driving force to the coupling driven part 14 in the usual manner, this driving force being transmitted through the runner hub 13, the splined connections 15 and 20, the transmission drive shaft 19, gears 28 and 29, overrunning clutch 34, and the gears 59 and 60. Should the teeth 63 of the jaw clutch 61 have been axially aligned with the end portions of the teeth 62 at the time the cam plate 80 was moved from position N to position F so that the spring 89 was effective only for bringing the ends of the teeth 63 into abutting relation with the ends of the teeth 62, said spring 89 will cause the teeth 63 to mesh with the teeth 62 upon the initial rotation of the gear 60 by the just traced second speed power train. This power train will then be mobilized.

As the vehicle proceeds while driven through the second speed train, a speed will eventually be reached at which the transmission drive shaft 19 and the brake drum 17 connected therewith will rotate sufficiently fast for causing a plurality of centrifugal weights W, of which one is shown in Fig. 1, to pivot counter-clockwise about their pivotal mountings 123 against the urge of a spring SP, Fig. 10, anchored at one end to the gear box by a pin P. Such pivotal movement of the weights W causes their heel portions 124 to shift the ball bearing unit 125 backwardly against the upper ends of the legs of a fork 126 carried non-rotatively upon a cross shaft 127 journalled in the clutch housing 128. This shaft 127 operates a linkage including an arm A fixed to said shaft, a link L, and an arm B fixed to the sleeve 115 (see Figs. 1, 2 and 10), so that upon the aforesaid operation of the speed responsive device in pivoting the weights W counter-clockwise the cam plate 114 will be pivoted clockwise for removing its long radius profile section 116 from registry with the stud 105 while positioning a short radius section 129 opposite said stud and thereby placing the shaft 107 and the shifter fork 108 under control of the spring 109 so that this spring is then effective for shifting the clutch ring 69 backwardly to place the teeth of the clutch 66 in ratcheting relation since the drive shaft 19 and the clutch ring 69 non-rotatively attached thereto rotate faster than the gear 60 during operation of the second speed power train. The ends of the clutch teeth 67 and 68 are bevelled in the manner shown to facilitate such ratcheting.

So long as the accelerator pedal 117 remains depressed at its toe portion the vehicle will proceed forwardly while driven in the second speed train and the clutch teeth 67 will continue ratcheting over the teeth 68. When the operator desires to shift from the second speed train into the fourth or direct drive train he will simply release the toe portion of the pedal 117 which will then return to the position shown under the influence of conventional spring means as a spring 130, and in doing so will pivot the lever 122a for enabling the spring 122e to close the engine throttle. Thereupon the engine and the clutch driving part 10 will decelerate as will the clutch driven part 14, the drive shaft 19 and the clutch ring 69, while the driven shaft 22 and the gear 60 connected therewith through the clutch 61 will continue rotation at substantially constant speed due to the vehicle inertia. During this deceleration of the engine, the gears 28 and 29 will correspondingly decelerate while the gear 59 meshed with the gear 60 and the normally driven member 37 of the overrunning clutch 34 overrun the clutch ring 35 as permitted by the clutch rollers 36. When the engine slows down sufficiently for the clutch ring 69 to synchronize with the gear 60 the spring 109 will slide the teeth 67 into mesh with the teeth 68 for establishing the fourth speed power train, the drive then being from the drive shaft 19 through the clutch 66, the hub of the gear 60 and the clutch 61 to the driven shaft 22. The normally driven member 37 of the overrunning clutch 34 will continue to overrun the normally driving ring 35 of this clutch.

I provide under control of the accelerator pedal 117 means for expediting deceleration of the drive shaft 19 for more quickly synchronizing the parts of the clutch 66 so that less time is required in shifting from the second to the fourth speed in the manner just described. This synchronizer means comprises a synchronizer brake band 131, Figs. 1 and 2, frictionally engageable with the circumferential periphery of the brake drum 17 for resisting rotation thereof.

Referring now to Fig. 3, the brake band 131 is shown as having upon one end a bracket 132 on which there is an apertured ear 133 wherein there is disposed a bolt 134 which projects through an apertured boss 135 upon the inner side of the clutch casing 128. The ear 133 is normally held firmly against the face of the boss 135 adjacently thereto by means of a helical spring 136 about the bolt 134 and exerting expansive force against the opposite face of the boss 135 and a spring seat 137 held in selected position axially of the bolt by means of a nut 138. A collar 139 limits the distance the bolt 134 can move endwise in the boss 135 while compressing the spring 136. Upon the opposite end of the brake band 131 there is formed a loop 140 in which there is disposed a pintle member 141. A bell crank 142 pivotally mounted upon a pin 143 anchored in the clutch casing 128 is connected with the pintle 141 at one of its legs while the other leg of the bell crank is connected by a link 144 with an end of a reciprocal rod 145 which is connected with a motor diaphragm (not shown) within a fluid motor 146. This motor is energizable by a vacuum line connected with a low pressure source as the intake manifold of the vehicle engine, said line including conduits 147 and 148 respectively connected with the motor 146 and said low pressure source and through which intercommunication is controlled by a valve 149. The valve 149 is in turn controlled by the armature of a solenoid 150, the latter being effective when energized by the passage of an electric current therethrough for moving its armature in a manner to cause communication of said low pressure source with the motor 146 through the valve 149 and said conduits 147 and 148. The valve 149 may be of the character shown in detail in my U. S. Patent No. 2,171,534, issued September 5, 1939. When the motor is thus connected with the low pressure source, the said diaphragm therein will be caused to move upwardly whereby the bell crank lever 142 will be rotated counter-clockwise with sufficient force to cause the band 131 to apply substantial frictional drag or braking action upon the drum 17 which normally rotates in the direction of the arrow.

The electric circuit for controlling energization of the solenoid 150 includes a conductor 151 for connecting one side of a battery 152 or other source of electrical energy with ground, a conductor 153, a switch 154 under the control of the accelerator pedal 117, a conductor 155, circuit connecting means associated with the vehicle ignition switch 156 and effective to connect the conductor 155 with a conductor 157 when said switch 156 is closed, a normally closed switch 158, a conductor 159 between said switch 158 and the solenoid 150, a conductor 160 and a normally closed switch 194 operable when closed to connect the opposite side of the circuit with ground for completing the same. The switch 154 includes contact members 161 and 162 between which circuit is closed by a conductor bridging member 163 when the bell crank 120 is rotated counter-clockwise to the position shown pursuant to release of the accelerator pedal 117. The switch 158 comprises a casing 164 mounted upon the gear box 21 and insulatively supported terminal members 165 and 166 which are normally mutually engaged by a circuit closing bridge 167 held in the position shown by a spring 168 which is insulated from the casing 164 by an insulator seat 169. A pin 170 is connected with the conductor bridge 167 by means of an insulator member 171. A boss 172 abuts against the lower end of the stem 170 to lift the conductor bridge 167 from engagement with the contacts 165 and 166 when the shifter fork 108 is rotated counter-clockwise for engaging the clutch 66.

It will be seen therefore that upon release of the accelerator pedal 117 for initiating the automatic change from second to fourth speeds each of the switches 154, 156, 158 and 194 is closed so the solenoid 150 will be energized for causing application of the synchronizer brake band 131 upon brake drum 17 to quickly decrease the speed of the clutch ring 69 to the speed of the gear 60 so the clutch 66 will engage for immediate establishment of the fourth speed train. When this train is established, however, the boss 172 will cause the switch 158 to open wherefore subsequent depression and release of the pedal 117 will fail to energize the solenoid 150 and the synchronizer brake 131 will not be applied.

While operating in fourth speed the operator may shift to the third speed instantaneously at will by simply depressing the heel portion of the accelerator pedal 117 whereby a member 173 upon which the pedal 117 is pivotally mounted, together with a stem 174 connected with said base member 173, is shifted axially downwardly against the force of a spring 175 of which the ends bear oppositely against the member 173 and a bracket 176 suitably connected to the underside of a floor board 177 in the driver's compartment of the vehicle. Downward movement of the stem 174 causes pivotal movement of a lever 178 for closing a switch generally designated 179 whereby a circuit is closed from the ungrounded side of the battery 152 through a conductor 180, said switch 179, a conductor 181, a solenoid 182, Fig. 2, and a conductor 183 back to ground for completing the circuit. This solenoid 182 is contained within a casing 184 which is supported by a mounting plate 185 upon the back end of the gear box 21. An armature (not shown) under control of the solenoid 182, when the latter is energized, is operable to move a link 186 axially rearwardly or to the right as viewed in Fig. 2 and in this manner to pivot the arm 86, to which the left end of the link 186 is connected by a pivot pin 187, counter-clockwise sufficiently to carry the stud 85 into the position shown in Fig. 2 from the position said stud 85 occupies when engaging the short radius section 87 of the cam plate 80 while the latter is in the position F. Such counter-clockwise rotation of the arm 86 causes like rotation of the shaft 88 and of the shifter fork 92 against the force of the spring 89 to disengage the clutch 61. Upon this disengagement of the clutch 61 while the clutch 66 is engaged the fourth speed train will be interrupted and the third speed train will be established, power then being transmitted from the drive shaft 19 through the clutch 66, gears 60 and 59, jaw clutch 41, gears 50 and 51 and the overrunning clutch 55 to the driven shaft. As soon as this power train is established the gear 60 will be rotating faster than the driven shaft to which the clutch ring 64 is splined wherefore the heel portion of the pedal 117 may be released to deenergize the solenoid 182 and permit the spring 89 to press the ends of the teeth 62 and 63 in ratcheting relation, the ends of these teeth being bevelled as shown to facilitate this ratcheting.

While the apparatus is connected for operation through the fourth speed train, should the vehicle be slowed down to a speed at which the drive shaft 19 rotates at a predetermined minimum, the spring SP, Fig. 10, will cause the weights W to return to the position shown in Fig. 1 and also cause the cam 114 to rotate counterclockwise incident to camming the arm 108, the shaft 107 and the shifter fork 108 clockwise for disengaging the clutch 66 whereupon establishment of the second speed power train occurs.

Likewise, while the apparatus is operating through the third speed power train, when the vehicle slows down to a speed at which the shaft 19 reaches the aforesaid predetermined minimum the centrifugal force of the weights W will no longer predominate over the force of the spring SP, so the latter will rotate the cam for disengaging the clutch 66. At this time both of the clutches 66 and 61 will be disengaged so that establishment of the first speed train will occur.

Should the operator, while the vehicle is being driven through the second speed train, wish to change to the first speed train to obtain more driving power from the engine or to enable him to maneuver the vehicle under closer supervision, he may do so instantaneously by momentarily depressing the heel portion of the accelerator pedal 117 for closing the switch 179 and energizing the solenoid 182 to rotate the arm 86, the shaft 88 and the shifter fork 92 counterclockwise for disengaging the clutch 61. Since the clutch 66 will already be disengaged at this time, both the clutches 61 and 62 will then be disengaged so that establishment of the first speed train is immediately obtained. Upon the establishment of this power train the gear 59 will drive the gear 60 faster than the gear 50 drives the driven shaft 22 through the overrunning clutch 55 wherefore the clutch teeth 62 will rotate faster than the teeth 63 so these teeth will simply ratchet harmlessly upon release of the heel of the pedal 117, and deenergization of the solenoid 182 whereby the spring 89 is again effective for sliding the teeth 63 axially against the teeth 62.

If it should be desired to start the vehicle from rest under conditions requiring an unusual amount of driving force the heel portion of the pedal 117 can be depressed immediately after moving the cam plate 80 to the forward position F whereby the solenoid 182 will be energized for declutching the clutch 61 and causing establishment of the first speed train to obtain. After the vehicle has thus been started forwardly in the first speed train, the heel portion of the pedal 117 may be released for deenergizing the solenoid 182, and without causing establishment of the second speed train so long as power is transmitted through the first speed train, because at this time the gear 60 will be rotating faster than the driven shaft 22 and the teeth 62 will simply ratchet over the teeth 63 when the spring 89 is permitted to shift the clutch ring 64 forwardly. However, a shift can be made from the first speed train to the second speed train at will by momentarily releasing the accelerator pedal to permit the engine and the drive shaft 19 to decelerate sufficiently for the gear 60 to synchronize with the driven shaft at which time the spring 89 will slide the teeth 63 forwardly into mesh with the teeth 62 to establish the second speed train. During the synchronization period the switch 163 will be closed as will the switches 156, 158 and 194 so the solenoid 150 will be energized for causing application of the synchronizer brake band 131 to expedite synchronization of the driving and driven components of the clutch 61 in the manner above described with respect to the corresponding components of the clutch 66. However, when the accelerator is later depressed at its toe portion for taking up the drive through the second speed train it will be noted that the lost-motion connection consisting of the pin 122c and the elongated opening 122d will provide for the switch 163 being opened to release the brake band 131 before the engine throttle is opened so the action of this brake band will not first oppose the engine driving force and then quickly release, resulting in a surge of power from the engine.

Subsequent to this establishment of the second speed train, the operator may shift automatically into fourth speed in the above described manner and backwardly into the third speed at will, or, the shift may be directed from second to third by pressing the heel of the pedal 117 during the synchronizing period.

Should it be desired to establish the first speed power train so that no automatic shift can be made to a higher ratio train upon release of the accelerator pedal, the operator in starting the vehicle will rotate the manually controlled plate 80 from position N beyond position F to a position E. Upon completion of this movement a long radius profile portion 190 will be in registry with the stud 105 to hold the clutch 66 disengaged sufficiently to permit the ratcheting of the teeth 67 over the teeth 68 but not sufficiently to let the teeth 68 rotate clockwise with the gear 60 (as viewed from the front) past the teeth 67 to insure no accidental closing movement of the clutch 66 while the teeth 68 are moving clockwise faster than the teeth 67 with a resulting clash and possible injury to the apparatus. The stud 96 will remain in the position shown since the slot section 95 will have slid idly past it wherefore the reverse idler gear 71 will remain in the unmeshed position. The stud 83 at the end of this rotation of the cam plate 80 will be at the clockwise end of the arcuate slot section 82 so the shifter fork 47 will be in its forward position and will have closed the first speed jaw clutch 41. The counter-clockwise end portion of a long radius profile section 191 of said cam plate 80 will be in registry with the stud 85 for holding the clutch 61 disengaged. Therefore, with the clutch 41 engaged and the clutches 61 and 66 held out of engagement the first speed train will be established and it will be impossible to establish any of the higher ratio trains. A lobe 192 will at this time be in position to press against a stem 193 of the switch 194 to open said switch and thus preclude application of the synchronizer brake band 131 upon release of the accelerator pedal. While operating in the emergency position E of the plate 80 and through the first speed train, the operator can at any time shift the plate to position F to cause the switch 194 to close and to otherwise condition the control apparatus for automatically effecting shifts into the higher ratio power trains pursuant upon release of the accelerator pedal in the manner hereinabove described.

The reverse power train is established by rotating the cam plate 80 clockwise from position N to position R. At the end of this rotative movement the stud 105 will remain upon a section of the long radius profile 191 for maintaining the clutch 66 disengaged, while the stud 85 will remain upon a section of the long radius profile 84 to maintain the clutch 61 disengaged. The stud 83 will then occupy the position shown in Fig. 2 for maintaining the clutch 41 disengaged while a more counter-clockwise portion of the arcuate slot section 95 registers therewith. However, the stud 96 will have been actuated by an outwardly curved portion 195 of the slot S to rotate the arm 97, which is pivoted upon the shaft 88, counterclockwise while moving the link 98 rearwardly endwise for pivoting the arm 100 counter-clockwise and thus shifting the fork 75 and reverse idler gear 71 rearwardly whereby this idler gear is meshed with the reverse train gears 69a and 72. Since the clutches 66, 61 and 41 are now disengaged, the tail shaft 22 will be caused to rotate reversely or in the counterclockwise direction as viewed from the front when the pedal 117 is pressed for accelerating the engine and the impeller element 10 of the clutch C to impart rotative force to the driven element 14 and thence to the drive shaft 19. The power train is continued through the gears 28 and 29, overrunning clutch 34, sleeve shaft 38 and the gears 69a, 71 and 72 to the tail or driven shaft 22.

When, for example, an engine-driven vehicle upon which this transmission apparatus is installed is brought to rest in the normal manner with the first, second or reverse trains mobilized, there is a tendency for the impositively driven impeller 14 to transmit torque through the mobilized of these trains to the load or road wheels and thus maintain such train loaded whereby the meshable mobilizing means therefor, as the clutch 41 for the first speed train and the gears 69a, 71 and 72 for the reverse train, offers considerable frictional resistance to the manual demeshing operation which is necessary at times. This difficulty is overcome and the remeshing of these mobilizing means is made easy by the combined functions of the overrunning clutch 34 and of the synchronizer brake mechanism shown in Figs. 1 and 3. This brake mechanism, as explained above, is operable to apply the brake band 131 against the drum 17 for decelerating the coupling runner 14, the drive shaft 19 and the drive ring 35 of the clutch 34, and, this brake means is further operable when the drive shaft 19 eventually comes to rest, in the stopping of the vehicle, to exert a force couple upon the drum 17 sufficient to rotate it in the direction opposite to its rotation prior to being stopped. While the drum 17 is rotating forwardly in the direction indicated by the arrow in Fig. 3 the frictional drag thereof upon the brake band 131 together with the force of the spring 136 is sufficient to prevent rotation of the band 131 in the reverse or clockwise direction, but when the drum comes to rest the tendency of the motor 146 in acting through the bell crank 142 to rotate the band 131 clockwise will no longer be opposed by the inertia of the drum and its frictional engagement with said band whereupon the force of the motor will predominate over that of the spring 136 and therefore rotate the band 131 clockwise incident to drawing the bolt 134 endwise through the apertured boss 135 while compressing the spring 136. The frictional engagement between the band 131 and the drum 17 will be sufficient for this backward rotation of said band to effect back rotation of the drum 17 and hence of the shaft 19 and the gears 28 and 29 and the clutch drive ring 35 whereby this ring 35 will overrun the actuator member 37 which is then connected with the road wheels and prevented from backward rotation. Consequently the clutch rollers 36 will be declutched and the loaded power train relaxed, that is, backlash will be created with respect to the teeth of the meshed toothed members therein as of the clutch 41 so they may be easily disengaged and reengaged.

In Fig. 4, the back ends of the clutch teeth 42 and the front ends of the teeth 196 upon the internal periphery ring 45 will be seen to be bevelled. Such bevelling of these teeth in the clutch 41 is in the direction that the teeth 196 when moved forwardly for engagement of the clutch, if not aligned between the spaces between the teeth 42, will cam said teeth 42 in the direction to rotate the sleeve 38 and hence the actuator member 37 counter-clockwise as viewed from the front and as permitted by the clutch rollers 36 from which the load will have been removed by the backward rotation of the brake drum 17 at the time the vehicle was brought to rest. Each time the accelerator pedal is released, while the cam 80 is in position F and while the first or second train is established, the brake band 131 will be actuated to rotate the clutch ring 35 reversely when the clutch C is operated at idling speed or at a speed insufficient to transmit to the impeller 14 a force couple exceeding that applied to the drum 17 by said band 131. Thus the action of the synchronizer brake means in imparting reverse rotation to the drive shaft 19 and to the drive ring 35 of the clutch 34, incident to the stopping of the vehicle subsequent to its operation through the first or second speed trains, will so condition the first speed train that the manually operated clutch 41 for controlling the mobilization thereof can be freely engaged or disengaged at will, and in this function the overrunning clutch 34 additionally cooperates with the bevelled ends of teeth in the clutch 41 by permitting counterclockwise rotation of the actuator member 37 while the ring 35 is held by the synchronizer brake band 131 against the normal loading torque of the coupling runner 14.

When stopping with the second speed power train established, which power train in the normal operation of this apparatus will be that left established at the time the vehicle is stopped, the drum 17 will be rotated backwardly for rotating the clutch ring 35 backwardly while the clutch actuator 37 is positively held against rotation by its vehicle running gear connection including the gears 59 and 60, the engaged clutch 61 and the driven shaft 22.

The teeth upon the reverse train gears 69a, 71 and 72 are bevelled upon certain of their ends as illustrated in Figs. 5 and 6 so that these will cooperate with the unloaded overrunning clutch 34 in the establishment of the reverse power train similarly to the manner in which the bevelled teeth of the clutch 41 cooperate in the establishment of the first speed train. Here it will be seen that the forward ends of the teeth upon the reverse gear 72 are slightly backwardly of the forward ends of the teeth upon the gear 69a so that when the idler gear 71 is slid backwardly for mutual mesh with the gears 69a and 72 the teeth of gear 71 will first mesh with those of the gear 69a and then with those of the gear 72. Since the idler gear 71 is freely rotatable upon its shaft 74 it can rotate in either direction for meshing with the gear 69a. In the meshing operation illustrated in Fig. 6 the demeshed teeth of gear 71 are shown in such axial alignment with the teeth upon gear 69a that upon movement of the gear 71 rearwardly it will be caused to rotate clockwise by the camming of the bevel faces at the rear ends of its teeth upon the bevel faces at the front ends of the teeth on gear 69a whereby the teeth of gear 71 will be moved into the dotted line positions preparatory to sliding into mesh with the teeth of gear 72. Following rearward movement of the teeth on the gear 71 as far as indicated by the dotted lines, these teeth will of course be aligned with spaces between the teeth on the gear 69a and addition rearward movement of this gear 71, in the example shown in Fig. 6, will cause the bevel ends of the teeth thereon to engage similar ends upon the forward ends of the teeth of gear 72 whereby the gear 71 will be caused to rotate clockwise and impart counter-clockwise rotation to the gear 69a with which the teeth on gear 71 are partially meshed. This clockwise rotation of the gear 71 and counter-clockwise rotation of the gear 69a is permitted by the clutch rollers 36 which at this time will be held released from the driving relation between the drive and driven members 35 and 37 as above described. It will be noted that following the initial meshing relation of the teeth upon gears 71 and 69a the bevelling upon the teeth of gears 71 and 72 is such that if the relative rotative position of said gears 71 and 72 is any other than exists when the teeth on these gears are respectively aligned with the spaces between the teeth on the other, the bevel ends of these teeth will coact for causing the aforesaid clockwise rotation of the gear 71 and counter-clockwise rotation of the gear 69a as permitted by the overrunning clutch 34. But in the special case when the teeth of gear 71 are aligned with the spaces between the teeth upon the gear 72 at the time that said gear 71 is moved rearwardly to the dotted line position, the teeth of the gears 71 and 72 will readily mesh without incurring gear rotation.

Counter-clockwise rotation of the countershaft reverse gear 69a in the manner aforesaid during meshing movement of the reverse idler 71 can be obtained by arranging the reverse gears as illustrated in Fig. 7 which corresponds to Fig. 6. In this arrangement the tail shaft gear is placed forwardly of the gear 69a so it will be engaged first by the rearwardly moved gear 71. In moving the gear 71 rearwardly it will either move to the position shown by dotted lines without incurring rotation, in the event its teeth align with the spaces between the teeth on gear 72, or it will be rotated counter-clockwise to such dotted line position by the camming of its bevelled tooth end faces against the bevelled end faces of the teeth on the gear 72. In either case the teeth of gear 71 will be partially meshed with the teeth of gear 72 when the dotted line position is reached so that upon further rearward movement the teeth of said gear 71 will either slide into aligned spaces between the teeth of gear 69a or will cam said gear 69a counter-clockwise by the action of the opposed bevelled ends of the teeth on these gears, as permitted by the overrunning clutch 34.

In Fig. 8 there is still a different arrangement of the bevelling of the teeth upon the reverse gears 69a, 71 and 72. As in Fig. 6 the countershaft gear 69a is disposed forwardly of the tail shaft gear 72, but the bevel upon the teeth of the gear 69a is opposite to that shown in Fig. 6, and this makes it possible to diminish the distance the gear 69a projects forwardly of the gear 72 as presently explained. Upon an initial backward movement of the idler gear 71 its bevelled tooth ends will cam along the points at the front ends of the teeth on the gear 69a to a transitory position shown by the dotted lines. Had the gear 71 occupied a rotative position slightly counter-clockwise (as viewed from the front) to that illustrated in Fig. 8 the points on the back ends of its teeth would have been in axial registry with the bevelled ends of the teeth on gear 69a so that in this initial backwardly movement of said gear 71 these points of its teeth would have been cammed counter-clockwise along the ends of the teeth on gear 69a, bringing the gear 71 into the same relation with respect to the gears 69a and 72 as is illustrated by the teeth shown in dotted outline but, of course, with the teeth on the gear 71 aligned with respectively different spaces between the teeth on the gear 69a without significance. Therefore, upon the attainment of this transitory position shown by dotted lines, the teeth of gear 71 will be aligned with the spaces between the teeth on the gear 69a, either because of having been initially aligned with these spaces or because of having been cammed clockwise or counter-clockwise by the action of their bevelled faces and points as above explained. Upon further backward movement of the gear 71 its teeth will either be aligned with the spaces between the teeth of gear 72 and simply slide into mesh therewith or said teeth will be aligned with the teeth of gear 72 to cause clockwise rotation of said gear 71 as the back ends of its teeth cam along the front ends of the teeth on gear 72 preparatory to the meshing of these gears. This clockwise rotation of the gear 71 effects the aforesaid counter-clockwise rotation of gear 69a as permitted by the overrunning clutch 34.

It will be obvious that with the bevels at the front ends of the teeth upon gear 69a arranged as in Fig. 8 that no camming action can take place between these teeth and the teeth of the gear 71 after the latter reaches the dotted line position. If, however, the bevels on the teeth of gear 69a were arranged as shown in Fig. 6, it would be possible for the bevelled ends upon the teeth of gears 69a and 71 to be in opposed contiguous axially aligned relation when the gear 71 occupies the transitory dotted line position and under these conditions if the teeth of gear 71 were aligned with spaces between the teeth of gear 72 so that upon continued backward movement of the gear 71 this gear would be held by the gear 72 from rotating, the coaction of the opposed axially aligned bevelled faces of the teeth on the gears 69a and 71 would be such that the gear 69a would be urged clockwise. But since the overrunning clutch 34 would prevent such clockwise rotation the meshing of the gear 71 with the gear 72 would be precluded. This difficulty may be overcome by moving the gear 72 rearwardly sufficiently far as illustrated in Fig. 6 for the teeth on the gear 71 to become completely aligned with the spaces between the teeth on the gear 69a prior to the occurrence of any meshing of the gears 71 and 72.

The arrangement of the reverse gears shown in Fig. 9 is like that of Fig. 8 with the exception that the direction of the bevel of the teeth on the gear 71 is reversed and the gear 72 is placed forwardly of the gear 69a. Thus when the gear 71 is moved backwardly its teeth first mesh with or engage and mesh with the teeth of the gear 72 whereby they are caused to occupy a transitory position shown by the dotted lines. Upon further backward movement of the gear 71 its teeth will slide into mesh with the teeth of the gear 69a either from a position in which the teeth of gear 71 are aligned with the spaces between the teeth of the gear 69a, pursuant to which said gear 69a is not rotated, or, from a position in which the teeth of the gears 71 and 69a are axially aligned so that opposed bevelled ends of the teeth of these gears will cause the gear 69a to rotate counter-clockwise.

This cooperation of the bevel teeth in the first speed train of the mobilizing clutch 41 and in the reverse train of meshable members 69a, 71 and 72 with the overrunning clutch 34 of which the unloading is automatically controlled by the reversing synchronizer brake mechanism, including the throttle responsive switch 154, enables the operator to quickly manually alternately establish the first speed power train and the reverse power train as is sometimes necessary in the manipulation of a vehicle as, for example, when advancing and reversing to maneuver it from close quarters or in obtaining a rocking motion of the vehicle to get it out of slippery ruts or the like where there is little traction for the road wheels.

Thus I have combined in power transmission apparatus, suitable for use upon a motor vehicle, an impositive coupling in driving relation with a multi-speed transmission in which overrunning clutch means is employed to enable automatic shifting between power trains, and synchronizing brake means automatically operable under control of throttle responsive means for quickly synchronizing the driving and driven parts to-be-connected power trains in the transmission, and the synchronizer brake means being of a character to reversely rotate the aforesaid overrunning clutch means to free the same of torque from said coupling and thus expedite the meshing and demeshing of means for mobilizing starting trains of said transmission.

Second embodiment

A second embodiment of the invention is incorporated into the power transmission apparatus shown in Figs. 11 and 12. This apparatus includes a fluid coupling C' corresponding to the coupling C and having its impeller element 10' operably connected with a source of power as a crankshaft 12' of an internal combustion engine which in this instance is assumed to be that of a motor vehicle. The driven or runner element 14' has its hub 13' splined at 200 to a short hollow shaft 201 journalled in opposite ends of the impeller member 10' upon bearing units 202 and 203. A transmission drive shaft 19' has a bearing section 204 of reduced diameter piloted in a rear section of the short hollow shaft 201 upon a set of needle bearings 205.

Said hollow shaft 201 has a radial flange 206 upon its back end, and to this flange there is connected by means of a plurality of circumferentially spaced bolts 207 the hub portion of a brake drum 17', an outwardly projecting radial flange 199 of an overrunning clutch drive ring 208 and a circular flange portion 209 of a jaw clutch member 210 having circumferentially spaced jaw teeth 211. An overrunning clutch unit 212 of which the ring 208 is the drive component comprises an annular actuator member 213 and clutch rollers 214 of the usual character. The actuator member 213 is splined at 215 to the transmission drive shaft 19' whereby power for driving said drive shaft clockwise as viewed from the front is transmittable from the coupling runner 14' through the splined connection 200, shaft 201, flange 206 of said shaft and the overrunning clutch unit 212.

Planetary change-speed gearing generally designated 216 is contained in a gear box 217. This gearing as well as control shafting, clutch means and speed-responsive control means therefore contained in the clutch housing 128' rearwardly of the brake drum 17' is like that shown in Fig. 1 of my United States Patent No. 2,171,534, with the exception of certain details hereinafter specifically pointed out. In view of the complete disclosure of this change-speed gearing in said patent, only the general structure and operation thereof will be herein described, the present invention relating to the combination with this change-speed gearing of the reversing synchronizer brake mechanism disclosed above with respect to the first embodiment and cooperable with the brake drum 17' and the over-running clutch 212 and an improved manually operable jaw clutch means presently to be described for connecting the transmission for forward or reverse drive.

This planetary gearing is disposed in a rotatable carrier 218 having a front spider 219 and a back spider 220 in which there are a plurality of paired axially aligned bearing units 221 and 222 in each pair of which there is journalled a shaft 223 on which there is fixed a set of gears 224, 225 and 226. A sun gear 227 fixed to the drive shaft 19' meshes with the planet gears 225, whereas a second sun gear 228 meshes with the planet gears 226, the sun gear 228 being fixed to the driven shaft 229. A third sun gear 230 is journalled upon the shaft 19' and meshes with the planet gears 224.

In mobilizing the first speed power train, a clutch ring 231 having internal teeth 232 is shifted rearwardly by means of a manually operable shifter fork 233, to engage the teeth 232 with complemental clutch teeth 234 upon the outer ring 235 of an overrunning clutch unit 236 wherein there are clutch rollers 237 which prevent counter-clockwise rotation (as viewed from the front) of an actuator member 238 of said clutch relatively to the ring 235 but permit clockwise rotation of the actuator relative thereto. Said actuator member is fixed upon a forwardly extending hub portion 239 of the planet carrier 218. The clutch ring 231 is slidable axially upon and carried by a circular flange 240 projecting forwardly from a wall 241 of the gear box, and said flange has a circumferentially arranged series of teeth 242 which mesh with the teeth 232 of the ring 231. A plurality of openings as 243 in the wall member 241 and in the base 244 of the flange 240 receive circumferentially spaced rearwardly projecting portions of the ring 231 upon which the teeth 232 are disposed, when the ring 231 is slid rearwardly as aforesaid for meshing the teeth 232 and 234. When thus meshed these teeth will connect the clutch ring 235 non-rotatively with the gear box wall 241 through the connection including the ring 231, the teeth 232 and 242 and the flange 240 which is connected with said wall.

After effecting this connection, when the operator accelerates his engine sufficiently above idling speed the clutch impeller 10' will transmit force to the runner 14' to cause the vehicle to be driven forwardly through the first speed power train, this train including said runner 14', the hollow shaft 201, overrunning clutch 212, drive shaft 19', sun gear 227, planet gears 225, planet gears 226 and the sun gear 228 to the driven shaft 229. During operation of this power train the planet carrier 218 will tend to rotate backwardly or counter-clockwise as viewed from the front, but this is prevented by the over running clutch 236 of which the ring 235 is then clutched to the gear box. Speed reduction is obtained because of the ratio in diameter of the gears 225 and 227 and in the gears 226 and 228. During operation of the first speed train, the gears 224 and 230 will cause clockwise rotation of a sleeve shaft 245 at reduced speed with respect to the drive shaft 19' and hence with respect to the jaw clutch drive counterpart 210, but when a predetermined minimum speed is reached the shaft 245 and inertia weight carrier 246 fixed thereto will rotate sufficiently fast to cause weights W' in said carrier to pivot clockwise as viewed in Fig. 11 and whereby their heel portions 247 will act through a coil spring 248 for yieldingly urging a jaw clutch counterpart 249 forwardly with its teeth 250 in ratcheting relation with the teeth 211 of the counterpart 210. The end faces of the teeth 250 and 211 are bevelled to facilitate such ratcheting.

Second speed is obtained by releasing the accelerator pedal to permit the vehicle engine, together with the clutch C' and the clutch counterpart 210, to decelerate until said counterpart synchronizes with the counterpart 249 which continues rotation with the vehicle running gear and the planetary gearing 216 at substantially constant speed as permitted by the overrunning clutch 212. When the clutch counterparts synchronize the teeth 250 and 211 will mesh for establishing the second speed power train which includes the sleeve shaft 245, gears 230 and 224 and the gears 226 and 228. Meanwhile the sun gear 227 will be driven from the gears 225 at an overspeed with respect to the clutch runner 14' whereby the clutch 212 is caused to overrun.

In establishing the third speed power train the accelerator pedal will again be momentarily released to cause a second deceleration of the engine, and hence of the sun gear 230 while the sun gear 228 operates at substantially constant speed because of its connection with the vehicle running gear, and when this occurs the gears 226 will be caused to advance orbitally about the sun gear 228 in the clockwise direction to cause clockwise rotation of the carrier 218 and of speed-responsive means (not shown) disposed within a casing 252 that is fixed to said planet carrier. This speed-responsive means is thus actuated for pressing rearwardly upon a spring 253 to yieldingly urge the internal teeth 254 of a sleeve 255 rearwardly into mesh with the teeth 256 of a jaw clutch member 257 splined to the driven shaft 229. This sleeve 255 is connected by an intermediate sleeve 258 with a rearwardly extending hub portion 259 of the carrier 218 so that when the engine is decelerated sufficiently for the carrier 218 to accelerate clockwise into synchronism with the driven shaft 229, the spring 253 will cause the teeth 254 to mesh with the teeth 256, thus non-rotatively connecting the carrier 218 with the driven shaft, and since the planet gears 226 are meshed with the sun gear 228 the planet carrier and the gearing carried thereby will be locked as a unitary mass coupling the drive sleeve 245 directly with the driven shaft 229 so that there will be a direct driving connection between the clutch runner 14' and the driven shaft 229.

There is associated with the brake drum 17' a brake band 131' corresponding to the brake band 131 described with respect to the first embodiment. Operating and control mechanism for this brake band 131' similar to that shown in the circuit diagram in Fig. 1 may be provided, there being the exception that the conductor 160, Fig. 1, would not be connected with ground through a switch 194, inasmuch as there is no emergency low speed control mechanism in association with the transmission shown in Fig. 11 that would necessitate a switch as 194. Therefore, when the accelerator pedal is released in establishing the second speed power train the brake band 131' will be applied to the drum 17' for expediting synchronization of the clutch counterparts 210 and 249, and, likewise, in the shift from the second to the third speed power trains, said brake band 131' will incur braking action upon the drum 17' to cause faster deceleration of the gear 230 relatively to the gear 228 to expedite increase in speed of the planet carrier to the speed of the driven shaft 229 and hence the engagement of the clutch teeth 254 and 256 for establishing the third speed train.

When the third speed train is established by the rearward movement of the sleeve 255, a pressure ring 260 will be forced rearwardly while acting against the lower ends of the legs on a shifter fork 261 to cause counter-clockwise rotation of this shifter fork as viewed in Fig. 11 and of a cross shaft 262 on which it is mounted, against the force of a spring 265. A lug 263 connected with the hub portion of the shifter fork 261 will be moved forwardly to manipulate an actuator link 264 for opening a switch 158' corresponding to the switch 158 shown in Fig. 1. Therefore upon the establishment of the third speed train the throttle-controlled circuit normally causing application of the synchronizer brake band 131' upon release of the accelerator pedal will be opened to disable said circuit and prevent synchronizing action of the brake band when such action is not needed or desired.

It will be understood that the third speed train can be disconnected instantaneously by demeshing the third speed clutch teeth 254 and 256 to cause the second speed power train to come into operation, and this may be done by effecting clockwise rotation of the control shaft 262 and of the shifter fork 261 to cause forward movement of the ring 260 and the clutch sleeve 255. Said shaft 262 may be controlled manually and/or by means of a solenoid as 182 in Fig. 2 and a throttle pedal controlled switch as 179 in Fig. 1.

To connect the reverse train the clutch ring 231 will be moved forwardly from a neutral position wherein none of the power trains are mobilized to a position in which the forward ends of the teeth 232 mesh with teeth 266. In this manner the sleeve shaft 245, to which a ring 267 carrying the clutch teeth 266 is splined, will be connected in fixed relation with the gear box wall 241 wherefore the sun gear 230 will be constrained against rotation. Following this connection and acceleration of the vehicle engine, driving power will be transmitted from the runner 14' through the overrunning clutch 212, the drive shaft 19', and the gear 227 to the planet gears 225. Since the gear 230 is now held against rotation and the ring 235 of the overrunning clutch 236 is disconnected from the gear box, the planet gears 224 will be advanced orbitally about said gear 230 while rotating the planet carrier 218 reversely or counter-clockwise as viewed from the front. Meanwhile the planet gears 226 will be orbitally advanced about the sun gear 228 but at less speed than that at which they are orbitally moved with the reversely rotating carrier 218 wherefore said gear 228 will be rotated reversely at a slow speed of desired ratio.

Assuming that the clutch ring 231 is in the rearward position with its teeth 232 meshed with the teeth 234 for mobilizing the first speed train, that the coupling C' has been rotated sufficiently fast by an acceleration of the vehicle engine to have caused power to have been transmitted through this power train and that the accelerator pedal has been released in bringing the vehicle to rest, upon this release of the accelerator pedal the synchronizer brake band 131' causes rapid deceleration of the drum 17' and ultimate reverse rotation of said drum and of the clutch ring 208 to relieve the load from this power train and maintain said power train unloaded by constraining the impositively urged runner 14' against rotation. The thus released or unloaded power train will incur no pressure between the teeth 234, 232 and 242 whereby manual disengagement of these teeth for disrupting the first speed train is easily accomplished. Once the first speed train has been demobilized while the brake band 131' holds the overrunning clutch ring 208 against rotation, said train will remain relaxed and can again be mobilized by shifting the ring 231 rearwardly. Re-meshing of the teeth 232 and 234 is facilitated by bevelling the back ends of the teeth 232 and the front ends of the teeth 234 as illustrated in Fig. 12 whereby if these teeth should be axially aligned at the time of meshing, the ring 235 will be cammed counter-clockwise as viewed from the front and as permitted by the clutch rollers 237.

Each time the vehicle engine is accelerated and decelerated by release of the accelerator pedal the drum 17' will be caused to rotate counterclockwise for relaxing the power train in which the apparatus had been operating. Therefore the overrunning clutch 212, when the clutch ring 231 is in the neutral position, will always be relaxed and held by the band 131' from being loaded by the impositively driven runner 14'. Consequently in shifting the ring 231 and the teeth 232 forwardly for engaging the reverse train, the bevelling upon the front ends of the teeth 232 and upon the back ends of the teeth 266 as illustrated in Fig. 12 will result in the ring 267, the sleeve shaft 245 and the sun gear 230 being rotated clockwise as viewed from the front and as permitted by the overrunning clutch 212 when the teeth 232 and 266 are axially aligned at the time of this meshing operation. Since the sun gear 228 is held against rotation by the vehicle running gear, said clockwise rotation of the gear 230 will act through the planet gears 224, 225 and 226 for causing the sun gear 227 and the clutch actuator member 213 to rotate clockwise. It will be seen therefore that the bevelling upon the opposed ends of the teeth 232 and 266 is such that the reverse train can always be easily meshed either from the position in which the teeth 232 are aligned with the spaces between the teeth 266 or from a position in which they are aligned with said teeth 266. Thus the brake band 131', in rotating backwardly to relax the overrunning clutch 212 common to the reverse and first speed trains and thus holding the same relaxed against the impositive force of the runner 14', cooperates with the bevelling upon the teeth 234, 232 and 266 to enable either of these to be easily mobilized or demobilized.

There is no intention of limiting the invention to the specific embodiments herein shown and described for numerous modifications employing the same principles of operation will be apparent to those skilled in the art, wherefore it should be clearly understood that the invention extends to other arrangements, details and structures falling within the spirit thereof.

I claim:

1. In apparatus for drivingly connecting a motor with a load, the combination of a change-speed transmission comprising a plurality of different speed ratio power trains individually establishable in driving relation between said motor and said load, a lower ratio of said trains including an overrunning clutch wherein there are parts relatively rotatable in one direction to enable said train to remain mobilized while a higher ratio of said trains is established and in operation and wherein during the transmission of power through said lower ratio train one of said parts transmits force to the other pursuant to tending to rotate relatively thereto in the direction opposite to that in which such relative rotation can occur, said lower ratio train also including complemental relatively rotatable toothed members meshable to mobilize said train, means connecting one of said toothed members for rotation with one of said clutch parts, cam means associated with said toothed members and operable incident to the meshing of said members for causing the one connected with said clutch part to rotate in the direction to cause said part to rotate in the one direction relatively to the other part, brake means for said other clutch part and operable to decelerate such part and to rotate the same in the direction opposite to normal to release the loading of said clutch and of said power train to facilitate demeshing and remeshing of said toothed members, and means operable to control such operation of the brake means.

2. In apparatus for drivingly connecting a throttle-controlled engine to an advanceable load, the combination of a coupling comprising a drive part drivable from said engine and a driven part to which predominatable driving force is transmitted from the drive part at slow speeds of the latter, a change-speed transmission comprising relatively lower and higher speed ratio power trains alternatively establishable in driving relation between said coupling driven part and the load, said lower ratio train including an overrunning clutch wherein the driven member is adapted to overrun the drive member to enable said train to remain mobilized during establishment and operation of the higher ratio train, said lower ratio train also including complemental relatively rotatable toothed members meshable to mobilize said train and causing demobilization thereof when demeshed, means connecting one of said toothed members for rotation with the overrunning clutch driven part, cam means associated with said toothed members and operable incident to the meshing of said members, when said overrunning clutch is relaxed, to cause the toothed member connected with the overrunning clutch driven part to rotate in the direction permitted by such driven part as it overruns the drive part of said overrunning clutch, speed-responsive means drivable from said engine and for disconnecting the higher ratio train when subjected to speeds below a certain minimum to establish the lower ratio train through which the aforesaid predominatable force is then transmittable to the load as when the load is brought to a stop whereby a tendency obtains to maintain the overrunning clutch loaded and thus offer resistance to the demeshing of said toothed members, brake means connected with the overrunning clutch drive member and operable to rotate said member in the direction opposite to normal against said predominatable force transmitted through the coupling, and means operable coordinately with the closing of the engine throttle to cause such operation of the brake means whereby upon bringing the load to rest there is assurance of relaxation of said overrunning clutch to facilitate demeshing and remeshing of said toothed members.

3. In apparatus for drivingly connecting a throttle-controlled engine to an advanceable load, the combination of a coupling comprising a drive part drivable from said engine and a driven part to which predominatable driving force is transmitted from the drive part at slow speeds of the latter, a change-speed transmission comprising relatively lower and higher speed ratio power trains alternatively establishable in driving relation between said coupling driven part and the load, a first overrunning clutch common to said trains, clutch means necessarily closed for the establishment of the higher ratio train and operable to demobilize the same, said lower ratio train including a second overrunning clutch wherein the driven member is adapted to overrun the drive member to enable said train to remain mobilized during establishment and operation of the higher ratio train, said lower ratio train also including complemental relatively rotatable toothed members meshable to mobilize such train and demeshable to demobilize the same, means connecting one of said toothed members for rotation with the driven part of the first overrunning clutch, cam means associated with said toothed members and operable incident to the meshing thereof, when said first overrunning clutch is relaxed, to cause the toothed member connected with said overrunning clutch driven part to rotate in the direction permitted by said driven part as it overruns its complemental drive part, control means for the engine throttle and including a pedal pivotally mounted at its heel portion and operable upon release of its toe portion to substantially close said throttle, a pivot mount for the heel portion of said pedal and depressible by a manual force applied to such pedal heel portion, means operable by the depression of said pedal mount to open said clutch means and thus demobilize the higher ratio train and establish the lower ratio train through which the aforesaid predominatable force is then transmittable to the load while the pedal toe portion is released for bringing the load to a stop and whereby a tendency obtains to load the first of said overrunning clutches, brake means connected with the drive member of the first overrunning clutch and operable to rotate said member in the direction opposite to normal against said predominatable force transmitted through the coupling, and means operable coordinately with such substantial closing of the engine throttle to cause said operation of the brake means whereby upon bringing the load to rest the first overrunning clutch will be relaxed to facilitate demeshing and remeshing of the toothed members controlling mobilization of the lower ratio train.

4. In apparatus for drivingly connecting a throttle-controlled engine to an advanceable load, the combination of a coupling comprising a drive part drivable from said engine and a driven part to which predominatable driving force is transmitted from the drive part at slow speeds of the latter, a change-speed transmission comprising forward and reverse drive power trains individually establishable in driving relation between the coupling driven part and said load, an overrunning clutch common to said trains and including drive and driven members of which force is transmitted from the drive to the driven member pursuant to the operation of either train, the forward train including force transmitting toothed members complementally meshable to mobilize said train and demeshable to demobilize the same, the reverse train also including force transmitting toothed members complementally meshable to mobilize such reverse train and demeshable to demobilize the same, means connecting said overrunning clutch driven member for rotation with one of the toothed members in each of said trains, cam means respectively associated with each complemental organization of said toothed members and each cam means being operable incident to the meshing of its associated toothed members, when said overrunning clutch is relaxed, to cause the one thereof connected with the overrunning clutch driven member to rotate in the direction permitted by such driven member as it overruns its associated drive member, brake means associated with the overrunning clutch drive member and operable to rotate said member in the direction opposite to normal against such force transmitted through the coupling, and means operable coordinately with the closing of the engine throttle to cause such operation of the brake means whereby upon bringing the load to rest said overrunning clutch will be relaxed to facilitate demeshing and meshing of either organization of said toothed members.

5. In apparatus for drivingly connecting a throttle-controlled engine to an advanceable load, the combination of a coupling comprising a drive part drivable from said engine and a driven part to which predominatable driving force is transmitted from the drive part at slow speeds of the latter, a change-speed transmission comprising a power train wherein there is an overrunning clutch including drive and driven parts and gears complementally meshable to mobilize said train, one of said gears being drivingly connected with the driven part of said overrunning clutch, a second of the gears being rotatable independently of the one gear and also being rotatable independently of a third of said gears when unmeshed therewith but being axially movable into mutual mesh with the first and third gears, said third gear being for connection with the load and to be normally held thereby against rotation when the load is at rest, the first and third gears each having teeth end portions in opposed relation with teeth end portions of the second gear, said first and third gears occupying different axial positions whereby the second gear is meshed with one of said first or third gears before the other, said teeth end portions on said other of the first or third gears having transverse bevelled end faces covering their entire ends and turned in such direction that they cam coactively against said end portions of the second gear to impart rotation to the first gear in the direction permitted by said overrunning clutch driven member as it overruns its associated drive member, following meshing of the second gear and said one gear and incident to the initial meshing of the second gear and said other gear, brake means associated with the overrunning clutch drive member and operable to rotate said member in the direction opposite to normal against the predominatable force transmitted through the coupling, and means operable coordinately with the closing of the engine throttle to cause such operation of the brake means whereby upon bringing the load to rest said overrunning clutch will be relaxed to facilitate demeshing and meshing of said gears.

6. In apparatus for drivingly connecting a motor with a load, the combination of a change-speed transmission comprising a plurality of different speed ratio power trains individually establishable in driving relation between said motor and said load, a lower ratio of said trains including meshable means effective to demobilize such train when demeshed and also including an overrunning clutch in which there are drive and driven members of which the driven member is adapted to overrun the drive member to enable such train to remain mobilized while a higher ratio train is established and in operation, brake means for said overrunning clutch drive member and operable to decelerate said member and to rotate said member in the direction opposite to normal to insure the non-existence of load pressure between said clutch members and consequent relaxation of said lower ratio train following deceleration of said drive member to zero speed, and means operable to cause such operation of the brake means.

7. The combination set forth in claim 6 and wherein there is means responsive to the condition of a higher ratio of said power trains and operable to preclude operation of said brake means while such higher ratio train is established.

8. In apparatus for drivingly connecting a throttle-controlled engine with a load, the combination of a change-speed transmission comprising a plurality of different speed ratio power trains individually establishable in driving relation between said engine and the load, a higher ratio of said power trains including drive and driven parts for respective connection with the engine and the load and meshable to establish such power train when said drive part is decelerated to synchronism with said driven part, a lower ratio of said trains including meshable means effective to demobilize such train when demeshed and also including an overrunning clutch in which there are drive and driven members of which the driven member is adapted to overrun the drive member to enable such train to remain mobilized while the higher ratio train is established and in operation, brake means for said higher ratio power train drive part and for the overrunning clutch drive member and operable to expedite deceleration of said part to synchronism with the driven part and also operable to decelerate said overrunning clutch drive member and operable to rotate said member in the direction opposite to normal to insure release of said clutch members and consequent relaxation of said lower ratio train following deceleration of said drive member to zero speed, and means in control of said brakes means and operable coordinately with the closing of said throttle to cause such operation of the brake means.

9. The combination set forth in claim 8 and wherein there is also means responsive to the condition of a higher ratio of said power trains and operable to preclude operation of said brake means while such higher ratio train is established.

10. The combination set forth in claim 8, wherein there is a pedal for controlling the engine throttle and wherein the means for causing the operation of said brake means is also under control of said pedal.

11. In apparatus for drivingly connecting a throttle-controlled engine as to an advanceable load, the combination of a coupling comprising a drive part drivable from said engine and a driven part to which predominatable driving force is transmitted from the drive part at slow speeds of the latter, a change-speed transmission comprising a plurality of different speed ratio power trains individually establishable in driving relation between said coupling driven part and said load, a lower ratio train of said trains including a jaw clutch disengageable to demobilize such train and also including an overrunning clutch in which there are drive and driven members of which the driven member is adapted to overrun the drive member to enable such train to remain mobilized while a higher ratio train is established and in operation, brake means connected with the overrunning clutch drive member and operable to decelerate said member when but a relatively small amount of torque is transmitted thereto through said coupling and to rotate said member in the direction opposite to normal to insure release of said clutch members and consequent relaxation of said lower ratio train following deceleration of said drive member to zero speed, and means operable substantially concurrently with the closing of the engine throttle, while said lower ratio power train is established, to cause the aforesaid operation of said brake means and thus facilitate disengagement of said jaw clutch for demobilizing said train.

12. In apparatus for drivingly connecting a throttle-controlled engine as to an advanceable load brakable for bringing it to a stop, the combination of a coupling comprising a drive part drivable from said engine and a driven part to which predominatable driving force is transmitted from the drive part at slow speeds of the latter, a change-speed transmission comprising relatively lower and higher speed ratio power trains alternatively establishable in driving relation between said coupling driven part and said load, the lower ratio train including a jaw clutch disengageable to demobilize such train and also including an overrunning clutch in which there are drive and driven members of which the driven member is adapted to overrun the drive member to enable such train to remain mobilized while the higher ratio train is established and in operation, speed-responsive means drivable from said engine and for disconnecting the higher ratio train when operating at speeds below a certain minimum to establish the lower ratio train through which power is then transmittable to the load while the latter advances at a speed less than that at which the engine tends to drive the same through such lower ratio train as when the load is being braked for stopping, brake means connected with the overrunning clutch drive member and operable to decelerate said member when said predominatable force is transmitted thereto through the said coupling and to rotate said member in the direction opposite to normal following deceleration thereof to zero speed, and means operable coordinately with the engine throttle and substantially at the time of closure thereof in the normal stopping of the load to cause the aforesaid operation of said brake means to insure relaxation of the lower ratio train and thus facilitate disengagement of said jaw clutch for demobilizing said train.

13. In apparatus for drivingly connecting a throttle-controlled engine of an engine-driven vehicle with the running gear wheels of such vehicle, the combination of a change-speed transmission wherein there are a plurality of power trains of different speed transmitting ratio individually establishable in driving relation between said engine and said wheels and of which at least one train is a cruising train having a ratio suitable for driving the vehicle at cruising speeds and of which at least another train of lower ratio than said cruising train is a starting train, said cruising train including drive and driven clutch parts respectively connected with said engine and said wheels and meshable, incident to a shift from the starting train into said cruising train, upon deceleration of the drive part to synchronism with the driven part to establish the cruising train, synchronizer brake means associated with said clutch drive part and operable to brake said part for decelerating the same as aforesaid, said starting train including meshable means effective to demobilize such train when demeshed and also including an overrunning clutch in which there are drive and driven members of which the driven member is adapted to overrun the drive member to enable said starting train to remain mobilized during establishment and operation of the cruising train, said synchronizer brake means being also associated with the drive member of said overrunning clutch and operable to decelerate said member and to rotate the same in the direction opposite to normal, following deceleration of said drive member to zero speed, to insure the non-existence of load pressure between said overrunning clutch members and consequent relaxation of said starting train to facilitate demeshing and remeshing of said meshable means, and means operable substantially concurrently with the closing of the engine throttle to effect operation of said synchronizer brake means.

14. In apparatus for drivingly connecting an engine with a load, the combination of a coupling comprising a drive part drivable from said engine and a driven part to which a predominatable driving force is transmitted from the drive part at slow speeds of the latter, a change-speed transmission comprising a plurality of different speed ratio power trains individually establishable in driving relation between said driven part and said load, a low ratio of said trains including an overrunning clutch wherein there are members relatively rotatable in one direction to enable said train to remain mobilized while a higher ratio of said trains is established and in operation and wherein during the transmission of power through said lower ratio train one of said members transmits force to the other pursuant to tending to rotate relatively thereto in the direction opposite to that in which such relative rotation can occur, said lower ratio train also including force transmitting means having complemental relatively rotatable toothed members meshable to mobilize said train, means connecting one of said toothed members with one of said overrunning clutch members to transmit force between said overrunning clutch and said force transmitting means during operation of the low ratio train, brake means for the other of said overrunning clutch members and operable to decelerate such member and to rotate the same in the direction opposite to that in which it is urged to rotate by the aforesaid predominatable force applied to said driven part, to release the loading of said overrunning clutch and thus facilitate demeshing of said toothed members, and means operable to control such operation of the brake means.

15. In apparatus for drivingly connecting a throttle-controlled engine to an advanceable load, the combination of a coupling comprising a drive part drivable from said engine and a driven part to which predominatable driving force is transmitted from the drive part at slow speeds of the latter, a change-speed transmission comprising relatively lower and higher speed ratio power trains alternatively establishable in driving relation between said coupling driven part and the load, said lower ratio train including an overrunning clutch wherein the driven member is adapted to overrun the drive member to enable said train to remain mobilized during establishment and operation of the higher ratio train, said lower ratio train also including complemental relatively rotatable toothed members meshable to mobilize said train and causing demobilization thereof when demeshed, means connecting one of said toothed members for rotation with the overrunning clutch driven part, means for disconnecting the higher ratio train to establish the lower ratio train through which the aforesaid predominatable force is then transmittable to the load as when the load is being brought to rest whereby a tendency obtains to maintain the overrunning clutch loaded and thus offer resistance to the demeshing of said toothed members, brake means connected with the overrunning clutch drive member and operable to rotate said member in the direction opposite to normal against said predominatable force transmitted through said coupling, and means operable coordinately with the closing of the engine throttle to cause such operation of the brake means whereby upon bringing the load to rest there is assurance of relaxation of said overrunning clutch to facilitate demeshing of said toothed members.

16. In apparatus for drivingly connecting a throttle-controlled engine to an advanceable load, the combination of a coupling comprising a drive part drivable from said engine and a driven part to which predominatable driving force is transmitted from the drive part at slow speeds of the latter, a change-speed transmission comprising forward and reverse drive power trains individually establishable in driving relation between the coupling driven part and said load, an overrunning clutch common to said trains and including drive and driven members of which force is transmitted from the drive to the driven member pursuant to the operation of either train, the forward train comprising force transmitting means including toothed members complementally meshable to mobilize said train and demeshable to demobilize the same, the reverse train also comprising force transmitting means including toothed members complementally meshable to mobilize such reverse train and demeshable to demobilize the same, means connecting the overrunning clutch driven member with one of the toothed members in each of said trains to transmit force from said overrunning clutch thereto, brake means for the overrunning clutch drive member and operable to decelerate said member and rotate the same in opposition to said predominatable force, to release the loading of said overrunning clutch and of the mobilized of said trains and thus facilitate demeshing of the toothed members in the force transmitting means thereof, and means operable to control such operation of the brake means.

17. The combination set forth in claim 16, and wherein said control means for the operation of the brake means is operable coordinately with the closing of the engine throttle and to cause operation of the brake means.

OSCAR H. BANKER.